Dec. 15, 1959  G. KERNCHEN  2,917,154
LOCKING DEVICE FOR REMOVABLE TYPEWRITER CARRIAGES
Filed Sept. 16, 1957  3 Sheets-Sheet 1

INVENTOR
Günter Kernchen

By
Pierce, Scheffler & Parker
Attorneys

Dec. 15, 1959   G. KERNCHEN   2,917,154
LOCKING DEVICE FOR REMOVABLE TYPEWRITER CARRIAGES
Filed Sept. 16, 1957   3 Sheets-Sheet 2
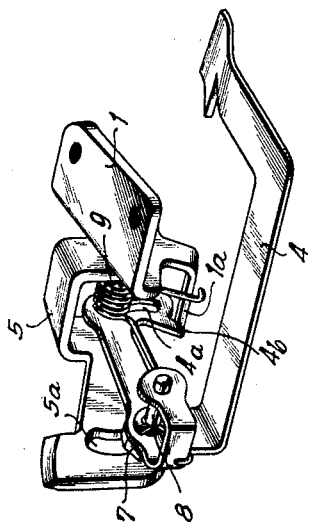
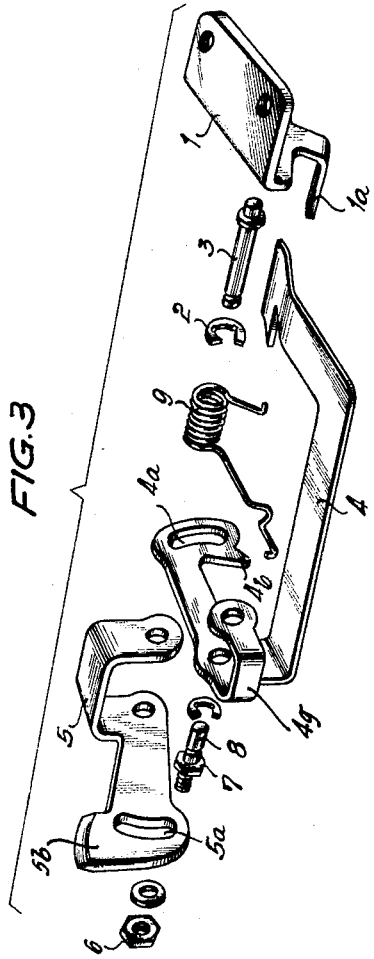
INVENTOR
Günter Kernchen
By
Pierce, Scheffler & Parker
Attorneys Dec. 15, 1959  G. KERNCHEN  2,917,154
LOCKING DEVICE FOR REMOVABLE TYPEWRITER CARRIAGES
Filed Sept. 16, 1957  3 Sheets-Sheet 3

INVENTOR
Günter Kernchen
BY:
Pierce, Scheffler & Parker
ATTORNEYS.

United States Patent Office 2,917,154
Patented Dec. 15, 1959

2,917,154

LOCKING DEVICE FOR REMOVABLE TYPEWRITER CARRIAGES

Günter Kernchen, Wilhelmshaven, Germany, assignor to Olympia Werke A.G., Wilhelmshaven, Germany Application September 16, 1957, Serial No. 684,377

2 Claims. (Cl. 197—193)

The present invention relates to new improvements in typewriters or similar machines which have a removable carriage with an axis of rotation extending parallel to the direction of travel of the carriage, and more particularly to a locking device for such removable carriage.

It is the principal object of the present invention to provide a locking device for the removable upper unit of a typewriter or similar machine which safely prevents any unintentional movement of the carriage part of this unit relative to its base when both together are being removed from the lower part of the machine.

Although prior to this invention there have already been provided devices for locking a carriage of a typewriter or the like against the action of the carriage spring, the strength of the retaining spring of these devices was, however, insufficient to prevent the carriage from moving due to its weight when the entire upper unit was tilted sideways. This disadvantage has been found very disagreeable, particularly during the repair and also during the assembly of these machines.

Although at first glance it might appear that this difficulty could be overcome simply by making the retaining spring of the locking pawl of greater strength, this has been found to be impossible because of the lack of space.

According to the present invention the mentioned disadvantage has been overcome by adjustably connecting the pawl of the locking lever, which engages the teeth of the carriage rack when the upper unit is removed, with a safety lever by means of pins, and by providing this safety lever with a detent which positively engages a stationary stop member and supports the action of the retaining spring so as to prevent the locking pawl from disengagement from the carriage rack under the weight of the carriage when tilted.

The present invention has the further advantage that, due to the lever transmission between the locking and safety levers and the provision of the detent on the safety lever which rests positively upon the stop member, the retaining spring only needs to be made of sufficient strength to prevent the safety lever from sliding off the stop member in the event that the carriage unit after being removed from the lower part of the machine might be subjected to severe jarring due to careless handling. The retaining spring may therefore be made of a considerably lower strength than previously required in other locking devices, although it will still fulfill the required conditions.

Another feature of the present invention consists in the provision of an elongated slot in the locking lever whereby this lever may be adjusted to different positions on a pin, and in pivotally mounting the locking lever on another pin. This latter pin on which the locking lever is mounted also carries the spring which acts upon the safety lever to prevent the same from sliding off the stop member. The bracket carrying this stop member may be secured to the base of the removable upper unit of the machine.

Further objects, features, and advantages of the present invention will be apparent from the following detailed description thereof, particularly when read with reference to the accompanying drawings, in which—

Fig. 2 shows a perspective detail view of the locking device alone;

Fig. 3 shows a perspective exploded view of the individual parts of the locking device.

Figure 1:
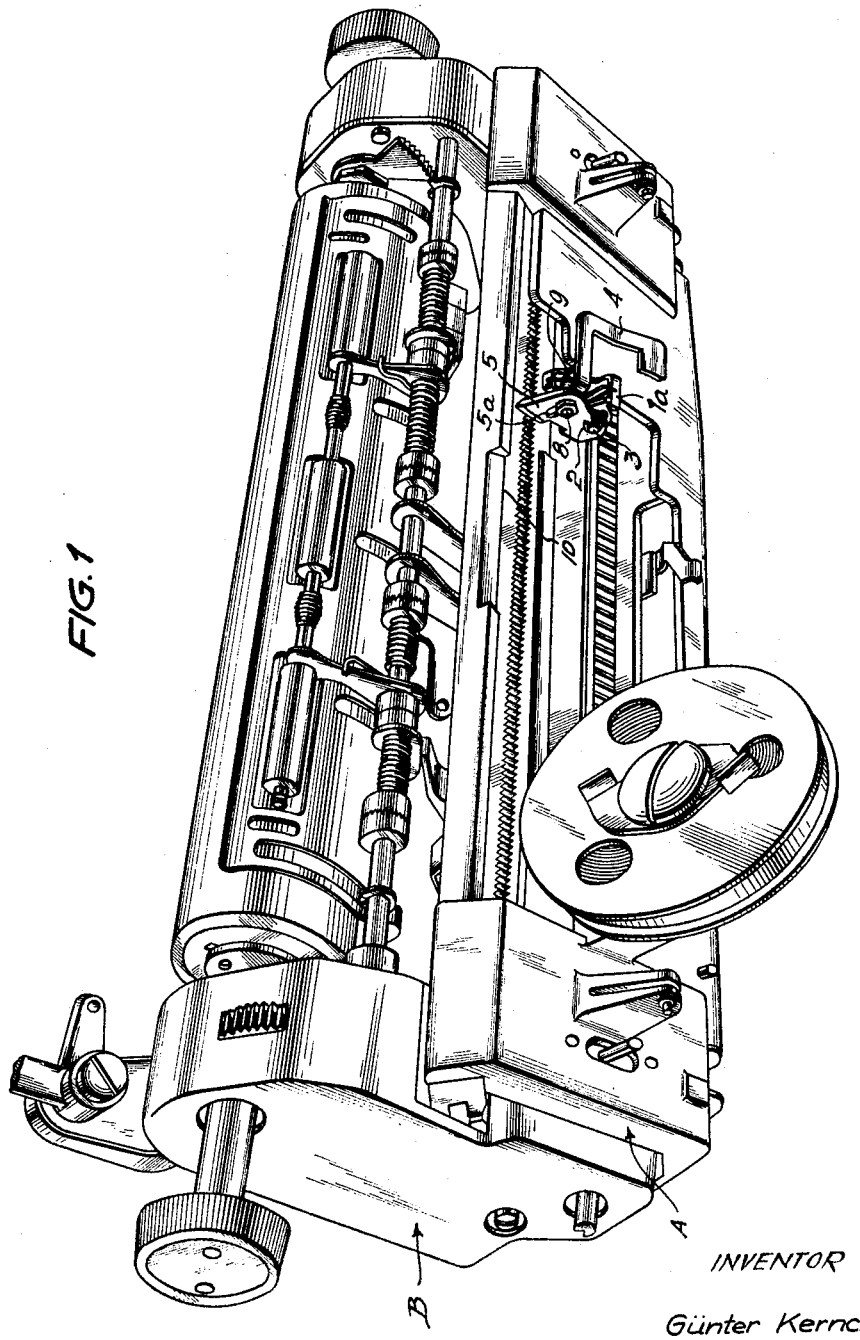
Fig. 1 shows a perspective view of the carriage with the new locking device thereon.
Figure 4:
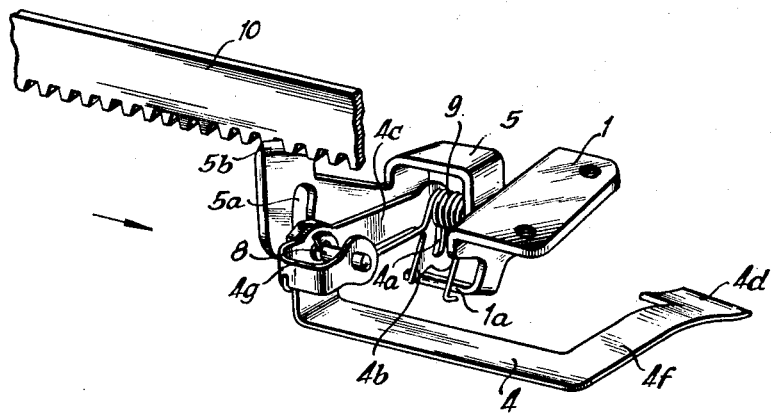
Figs. 4 and 5 are detailed perspective views of the rack and lock device in the engaged and disengaged states, respectively.
Figure 5:
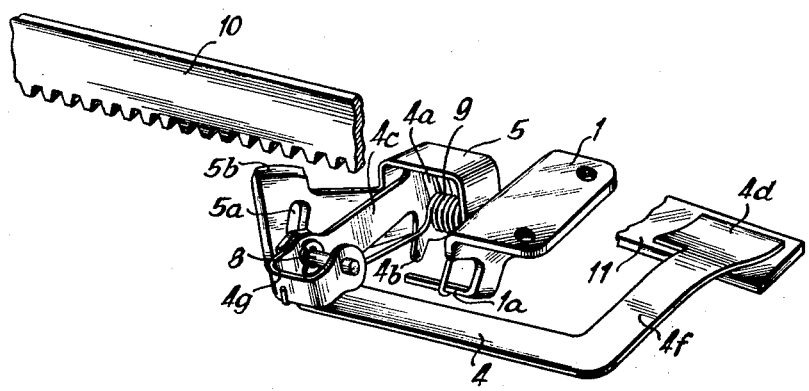

Referring to the drawings, the locking device according to the invention includes a bracket 1, the flat plate portion of which is provided with two apertures through which a pair of screws are passed to secure the bracket to the guide base A of the reciprocatory carriage B. The arm depending from this flat portion is bent twice at a right angle so as to be substantially of a Z shape, and the free end 1a is designed to act as a stop member. As illustrated in Fig. 3, the central portion of bracket 1 which extends vertically to the flat mounting plate and to stop member 1a carries a pin 3 for receiving a locking lever 4 and a pawl 5 which are pivotally secured thereon by a spring ring 2. For being guided more securely on pin 3, pawl 5 is bent at one end into a U-shape and terminates at its other end into a ratchet tooth 5b which engages the teeth of the carriage rack 10. Underneath this ratchet tooth, pawl 5 is provided with a curved slot 5a in which a pin 8 is adjustably secured by means of nuts 6 and 7. Pin 8 passes through a pair of apertures in a U-shaped portion 4g on lever 4 and thus serves as a shaft on which lever 4 is adapted to pivot. One end of locking lever 4 is provided with a slot 4a and a detent 4b. This slotted end 4a is disposed between the U-shaped portion of pawl 5 and slidable on pin 3, while detent 4b serves as a stop which is adapted to engage against stop member 1a on bracket 1. When the carriage unit is placed upon the lower part of the typewriter, the other end 4d of arm 4f of locking lever 4 rests upon portion 11 of the main typewriter frame and unlocks the carriage as shown in Fig. 5. Between the free arm of the U-shaped portion of pawl 5 and the slotted end 4a of lever 4, pin 3 also carries a spring 9, one end portion of which bears against pin 8 and the other end against stop member 1a on bracket 1, thus tending to press the ratchet tooth 5b on pawl 5 into engagement with the rack 10 of the carriage.

When the carriage unit is lifted off the lower part of the typewriter, spring 9 will turn pawl 5 and lever 4 about pin 3 until pawl 5 engages into the rack 10 of the carriage. When the carriage is further lifted, the outer end of spring 9 which bears against the lower edge of the U-shaped portion 4g of lever 4 continues to pivot the latter, but not about pin 3 but about pin 8 until detent 4b bears against stop member 1a on bracket 1. This double pivoting action permits spring 9 to be made of a considerably lower strength than previously required. Furthermore, this action prevents the carriage, if accidentally jarred, from immediately starting to move due to the force of the carriage spring.

When the carriage unit is being replaced upon the lower part of the typewriter, the unlocking operation proceeds in the reverse order to the locking operation, namely, first by the release of lever 4 by its rotation about pin 8, and then by the rotation of pawl 5 and lever 4 about pin 3.

The locking mechanism according to this invention may also be applied to adding and calculating machines, teletypewriters, or similar machines which have a slidable or removable carriage. This locking mechanism permits for the first time an easy removal of the carriage from the lower part of the typewriter or similar machine by insuring that during such removal the carriage will be safely locked in both directions.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In a typewriter having a roller carriage unit removably connected to a typewriter frame, said roller carriage unit consisting of a guide base member and a carriage member longitudinally reciprocably mounted in said guide base member; means for locking said carriage member against movement relative to said guide base member when said roller carriage unit is removed from said typewriter frame comprising a rack secured to said carriage member parallel to the lonitudinal axis thereof, a bracket secured to said guide member, said bracket having a stop portion thereon, a first pin secured to said bracket parallel to said rack, a locking lever having at a first end a slot through which said first pin extends and a detent adjacent said slot, a pawl pivotally mounted at one end on said first pin, said pawl having a pawl tooth at the other end thereof, a second pin secured to said pawl adjacent said pawl tooth and extending parallel to said first pin, said locking lever being pivotally connected to said second pin, spring means normally pivotally biasing said locking lever about said second pin to position said lever with one extremity of said slot adjacent said first pin and said detent in engagement with said bracket stop portion and also pivotally biasing said pawl in a direction about said first pin to position said pawl tooth in engagement with said rack, said locking lever having a projecting portion adapted to engage said typewriter frame when said carriage unit is secured thereto to initially pivot said locking lever about said second pin to cause the other extremity of the slot to engage said first pin and thus disengage said detent from said bracket stop, and to subsequently pivot said pawl about said first pin to disengage said pawl tooth from said rack.

2. Apparatus as defined in claim 1 wherein said second pin is adjustably mounted in a slot in said pawl so that the distance between said second pin and said pawl tooth may be adjusted as desired.

References Cited in the file of this patent

UNITED STATES PATENTS

| 484,132 | Barron et al. | Oct. 11, 1892 |

FOREIGN PATENTS

| 350,163 | Germany | Dec. 9, 1919 |